United States Patent
Wang et al.

(10) Patent No.: US 10,759,298 B2
(45) Date of Patent: Sep. 1, 2020

(54) ELECTRIC-DRIVE MOTOR VEHICLES, SYSTEMS, AND CONTROL LOGIC FOR PREDICTIVE CHARGE PLANNING AND POWERTRAIN CONTROL

(71) Applicant: GM Global Technology Operations LLC, Detroit, MI (US)

(72) Inventors: Yue-Yun Wang, Troy, MI (US); Junfeng Zhao, Troy, MI (US); Suresh Gopalakrishnan, Troy, MI (US); Yiran Hu, Shelby Township, MI (US); Norman K. Bucknor, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 189 days.

(21) Appl. No.: 16/116,129

(22) Filed: Aug. 29, 2018

(65) Prior Publication Data

US 2020/0070679 A1  Mar. 5, 2020

(51) Int. Cl.
- *B60L 53/64* (2019.01)
- *H01M 2/10* (2006.01)
- *B60W 20/13* (2016.01)
- *B60L 58/21* (2019.01)

(52) U.S. Cl.
CPC ............ *B60L 53/64* (2019.02); *B60L 58/21* (2019.02); *B60W 20/13* (2016.01); *H01M 2/1083* (2013.01)

(58) Field of Classification Search
None
See application file for complete search history.

(56) References Cited

U.S. PATENT DOCUMENTS

| | | | |
|---|---|---|---|
| 7,810,476 B2 | 10/2010 | Wang et al. | |
| 8,091,416 B2 | 1/2012 | Wang et al. | |
| 8,201,444 B2 | 6/2012 | Wang et al. | |
| 8,276,373 B2 | 10/2012 | Wang et al. | |
| 8,392,091 B2 | 3/2013 | Hebbale et al. | |
| 8,612,119 B2 | 12/2013 | Wang et al. | |
| 8,694,197 B2 | 4/2014 | Rajagopalan et al. | |
| 9,133,750 B2 | 9/2015 | Levijoki et al. | |
| 2008/0051973 A1 | 2/2008 | Gangopadhyay et al. | |

(Continued)

*Primary Examiner* — Richard M Camby
(74) *Attorney, Agent, or Firm* — Quinn IP Law

(57) ABSTRACT

Presented are intelligent vehicle systems and control logic for predictive charge planning and powertrain control of electric-drive vehicles, methods for manufacturing/operating such systems, and electric-drive vehicles with smart charge planning and powertrain control capabilities. Systems and methods of AI-based predictive charge planning for smart electric vehicles use machine-learning (ML) driver models that draws on available traffic, location, and roadway map information to estimate vehicle speed and propulsion torque requirements to derive a total energy consumption for a given trip. Systems and methods of AI-based predictive powertrain control for smart hybrid vehicles use ML driver models with deep learning techniques to derive a drive cycle profile defined by a preview route with available traffic, geopositional, geospatial, and map data. ML-generated driver models are developed with collected data to replicate driver behavior and predict the drive cycle profile, including predicted vehicle speed, propulsion torque, and accelerator/brake pedal positions for a preview route.

20 Claims, 4 Drawing Sheets

(56) References Cited

U.S. PATENT DOCUMENTS

| | | |
|---|---|---|
| 2008/0265835 A1 | 10/2008 | Reed et al. |
| 2010/0198754 A1 | 8/2010 | Jones et al. |
| 2012/0085082 A1 | 4/2012 | Levijoki et al. |
| 2012/0181953 A1 | 7/2012 | Hsu et al. |
| 2012/0286063 A1 | 11/2012 | Wang et al. |
| 2013/0027048 A1 | 1/2013 | Schwarz et al. |
| 2013/0038279 A1 | 2/2013 | Seyerle et al. |
| 2014/0197776 A1 | 7/2014 | Schlaupitz et al. |
| 2016/0052450 A1 | 2/2016 | Chan et al. |
| 2016/0285296 A1 | 9/2016 | Namou et al. |
| 2016/0318501 A1* | 11/2016 | Oldridge ............... B60W 20/10 |
| 2019/0185004 A1* | 6/2019 | Kim ................... B60L 15/2045 |
| 2019/0232944 A1* | 8/2019 | Kai ....................... B60W 10/08 |
| 2020/0047629 A1* | 2/2020 | Cho ................... B60L 15/2045 |

\* cited by examiner

ELECTRIC-DRIVE MOTOR VEHICLES, SYSTEMS, AND CONTROL LOGIC FOR PREDICTIVE CHARGE PLANNING AND POWERTRAIN CONTROL

INTRODUCTION

The present disclosure relates generally to electric-drive motor vehicles. More specifically, aspects of this disclosure relate to intelligent vehicle systems and control logic for predictive charge planning and powertrain control of electric-drive motor vehicles.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving power to the vehicle's road wheels through a manually or automatically shifted multi-speed transmission and a final drive system (e.g., differential, axle, etc.). Automobiles have historically been powered by a reciprocating-piston type internal combustion engine (ICE) assembly due to its ready availability and relatively inexpensive cost, light weight, and overall efficiency. Such engines include two and four-stroke compression-ignited (CI) diesel engines, four-stroke spark-ignited (SI) gasoline engines, six-stroke architectures, and rotary engines, as some non-limiting examples. Hybrid and full electric vehicles, on the other hand, utilize alternative power sources to propel the vehicle and, thus, minimize or eliminate reliance on a fossil-fuel based engine for power.

Hybrid vehicle powertrains utilize multiple sources of traction power to propel the vehicle, most commonly operating an internal combustion engine assembly in conjunction with a battery-powered or fuel-cell-powered electric motor. A hybrid electric vehicle (HEV), for example, stores both electrical energy and chemical energy, and converts the same into mechanical power to drive the vehicle's road wheels. The HEV is generally equipped with an electric machine (E-machine), often in the form of an electric motor/generator unit (MGU), that operates in parallel or in series with an ICE. Series hybrid architectures derive all tractive power from electric motor(s) and, thus, eliminate any driving mechanical connection between the engine and final drive members. By comparison, the engine and motor/generator assemblies of parallel hybrid architectures each have a driving mechanical coupling to the power transmission. Since hybrid vehicles are designed to derive their power from sources other than the ICE, engines in HEVs may be turned off, in whole or in part, while the vehicle is propelled by the electric motor(s).

A full electric vehicle (FEV)—colloquially known as an "electric car"—is an alternative type of electric-drive vehicle configuration that altogether eliminates the internal combustion engine and attendant peripheral components from the powertrain system, relying solely on electric traction motors for vehicle propulsion. Battery electric vehicles (BEV), for example, utilize energy stored within a rechargeable, onboard battery pack, rather than a fuel tank, fuel cell, or fly-wheel, to power the electric motor(s). The electric vehicle employs an electrical power distribution system governed via a motor controller for transmitting electrical energy back-and-for between the onboard battery pack and one or more electric motors. Plug-in electric vehicle (PEV) variations allow the battery pack to be recharged from an external source of electricity, such as a public power grid via a residential or commercial vehicle charging station. Wireless Electric Vehicle Charging (WEVC) offers an alternative to using physical plugs to recharge a BEV.

As hybrid and electric vehicles (collectively "electric-drive" vehicles) become more prevalent, infrastructure is being developed and deployed to make day-to-day use of such vehicles feasible and convenient. Electric vehicle supply equipment (EVSE) comes in many forms, including residential electric vehicle charging stations (EVCS) purchased and operated by a vehicle owner (e.g., installed in the owner's garage), publicly accessible EV charging stations deployed by public utilities or private retailers (e.g., at gas stations or public charging stations), and more sophisticated high-voltage, high-current charging stations used by automobile manufacturers, dealers, and service stations. Plug-in electric vehicles originally equipped with an onboard traction battery pack, for example, can be charged by physically connecting a charging cable of the EVCS to a complementary charging port of the vehicle. Wireless electrical charging systems have also been developed for recharging electric vehicles without the need for charging cables and cable ports. Many such wireless charging systems utilize electromagnetic field (EMF) induction techniques to establish an electromagnetic coupling between a charging pad or platform external to the vehicle and a compatible receiver component onboard the vehicle. This receiver component is electrically connected to the rechargeable battery pack to transmit thereto current induced by the external charging pad/platform.

SUMMARY

Disclosed herein are intelligent vehicle systems and attendant control logic for predictive charge planning and powertrain control of electric-drive vehicles, methods for manufacturing and methods for operating such systems, and electric-drive vehicles equipped with smart charge planning and powertrain control systems. By way of non-limiting example, there are presented novel systems and methods of artificial intelligence (AI) based predictive charge planning for smart electric vehicles. As the vehicle travels from point A to point B, vehicle speed and propulsion torque are predicted by a machine learning (ML) driver model that draws on available traffic information, geopositional and geospatial data, roadway map information, etc. Vehicle speed and torque predictions, along with other vehicle propulsion and auxiliary device models, are employed to derive total energy consumption during the trip and concomitantly provide an optimized charge planning protocol for the vehicle.

Existing techniques for predicting EV travel range are oftentimes unreliable as they depend heavily on, yet are unable to properly account for, real-time route conditions, actual gross vehicle weight, and individual driver style. Disclosed methods employing ML techniques help to resolve this issue by deriving vehicle speed and required propulsion torque based on computationally modeled driver behavior and real-time traffic information for a preview route without requiring exact vehicle weight. In addition, total energy consumption to complete a customer-designated route may be predicted through a combination of electrical-drive ("eDrive") energy consumption models, auxiliary device models, and autonomous electronics energy consumption models. Using this information, the intelligent vehicle charging system is operable to recommend or guide the vehicle to one or more optimal charging stations, suggest an alternative driving route, or implement a set of enhanced low-energy-consumption driving rules.

Also presented are novel systems and methods of AI-based predictive powertrain control for smart hybrid vehicles. Using machine learning driver models, a representative method provides predictive powertrain control that optimizes energy usage and efficiency for hybrid gas-electric vehicles, with most-notable optimization for mild hybrid powertrains. Deep structured hierarchical learning ("deep learning") is employed to predict driver behavior, which in turn is used to derive a drive cycle profile defined by a preview route with available traffic information, geopositional and geospatial data, roadway map information, etc. Key sensor-generated propulsion data, along with route and traffic information, are collected by a cloud computing resource service or similarly suitable high-speed, high power processing device. An ML-generated driver model is developed using collected data to predict a drive cycle profile, including predicted vehicle speed, propulsion torque, and accel./brake pedal positions for a preview route. Predictive powertrain control helps to optimize fuel consumption and battery state of charge (SOC), constrained by scheduling extended stop/start and power-split operations for mild REV, plugin hybrid, or full HEV based on predicted cycles. In general, AI may be used to "learn" and replicate driver behavior in order to forecast a driving cycle profile for a given route. User/driver identification may be employed via the vehicle controller to recognize which driver behavior profile to use for the actual person driving. Smart vehicle powertrain systems may employ this technique to fully utilize hybrid vehicle potential and optimize energy management based on road conditions and anticipated vehicle maneuvering and, thus, reduce fuel consumption and prolong battery charge.

Aspects of this disclosure are directed to ML-based behavioral modeling techniques and computer-executable algorithms for predictive charge planning and/or predictive powertrain control of hybrid or electric vehicles. For instance, a method is presented for controlling operation of an electric-drive motor vehicle. This representative method includes, in any order and in any combination with any of the above and below disclosed options and features: determining, via a resident or remote vehicle controller of the electric-drive motor vehicle, a vehicle origin and a vehicle destination for the motor vehicle; conducting, e.g., via a vehicle navigation system, a geospatial query to identify a designated route to move from the vehicle origin to the vehicle destination; receiving, from a memory-stored map database, road-level data (e.g., speed limits, traffic light locations, stop sign positions, gradients, etc.) associated with the designated route; determining, e.g., via a remote computing resource service based on the road-level data and real-time roadway traffic and disturbance data (e.g., rush-hour traffic, inclement weather delays, auto collision, construction, etc.) a predicted motor speed of the traction motor for completing the designated route; estimate a predicted motor torque of the traction motor by applying a machine-learning driver model, as a function of accelerator pedal position, to the predicted motor speed; integrating the predicted motor torque to calculate a total motor energy usage for the traction motor to propel the motor vehicle across the designated route from the vehicle origin to the vehicle destination; and transmitting, via the resident vehicle controller to a resident vehicle subsystem, one or more command signals to execute one or more control operations based on the total motor energy usage.

Other aspects of the present disclosure are directed to hybrid or electric vehicles with ML-based predictive charge planning and/or predictive powertrain control capabilities.

As used herein, the term "motor vehicle" may include any relevant vehicle platform, such as passenger vehicles (full electric, full hybrid, mild hybrid, fuel cell, etc.), commercial vehicles, industrial vehicles, tracked vehicles, off-road and all-terrain vehicles (ATV), motorcycles, farm equipment, boats, airplanes, etc. In an example, an electric-drive motor vehicle includes a vehicle body with multiple road wheels operatively attached to the vehicle body. A traction motor, which is mounted onto the vehicle body, drives one or more of the road wheels to thereby propel the vehicle. Optional powertrain architectures may include a series or parallel hybrid configuration with an ICE assembly. A rechargeable traction battery pack is mounted to the vehicle body and electrically coupled to the traction motor for powering the motor. The electric-drive motor vehicle is also equipped with a resident vehicle navigation system that is attached to the vehicle body, e.g., mounted inside the passenger compartment. The vehicle navigation system includes a vehicle location tracking device, a user input device, and an electronic display device.

Continuing with the discussion of the above example, a resident vehicle controller is attached to the body of the electric-drive motor vehicle and communicatively connected to the traction motor, battery pack, and navigation system. This vehicle controller is programmed to execute memory-stored instructions to: determine, e.g., via cooperative operation with the vehicle navigation system's location tracking device and input device, a vehicle location and a vehicle destination for the motor vehicle; determine, e.g., via wireless communication between the vehicle navigation system and a global positioning system (GPS) satellite service, a designated route for driving from the vehicle origin to the vehicle destination; determine, e.g., via a remote computing resource service from a memory-stored map database, road-level data associated with the designated route; determine, e.g., via the remote computing resource service based on the road-level data and roadway traffic and disturbance data for the designated route, a predicted vehicle speed and a predicted motor speed for the traction motor to complete the designated route, e.g., using a machine learning driver model; determine, e.g., via the remote computing resource service, a predicted motor torque of the traction motor by applying a machine-learning driver model as a function of accelerator pedal position to the predicted motor speed; determine, e.g., via the remote computing resource service by integrating the predicted motor torque, a total motor energy usage for the traction motor to propel the motor vehicle across the designated route from the vehicle origin to the vehicle destination; and transmit one or more command signals to a resident vehicle subsystem to execute one or more control operations based on the total motor energy usage.

For any of the disclosed systems, methods, and vehicles, an inverter/converter energy loss, e.g., resulting from operating a power inverter module and/or an AC-DC converter during the designated route, may be calculated as a function of the predicted motor speed and the predicted motor torque. Likewise, a motor energy loss, e.g., resulting from operating the traction motor for the designated route, may be calculated as a function of the predicted motor speed and the predicted motor torque. Optionally, an estimated auxiliary device energy usage may be calculated, e.g., for operating a DC-DC converter, a 12V starting, lighting, and ignition (SLI) battery, or other in-vehicle electronic devices during the designated route. An estimated autonomous-driving electronics energy usage may be calculated, e.g., for operating one or more in-vehicle sensors, cameras and/or processors in autonomous or Advanced Driver Assistance System (ADAS) driving mode during the designated route. In any of the foregoing instances, the command signal(s) to execute the control operation may be further based on the inverter/converter energy loss, motor energy loss, autonomous-driving electronics energy usage, and/or estimated auxiliary device energy usage.

For any of the disclosed systems, methods, and vehicles, a total motor energy usage $E_{MGU}$ may be calculated as a function of predicted motor speed ω, predicted motor torque $T_{MGU}$, and total regenerated energy $E_{RGN}$. As another option, remaining battery energy ΔE for the vehicle's traction battery pack when the vehicle reaches its destination may be calculated as a function of a minimum SOC a to maintain the traction battery pack in a healthy state, an open circuit voltage $V_{OC}$ of the traction battery pack, a predicted total energy usage Ep(A:B), and a battery energy loss $E(T)_{battloss}$ of the traction battery pack as a function of battery temperature T. In this regard, a predicted total load current, which accounts for the total motor energy usage, may be calculated for the motor vehicle to traverse the designated route from the vehicle origin to the vehicle destination. In this instance, the executed control operation is further based on the predicted total energy usage.

For any of the disclosed systems, methods, and vehicles, a remaining state of charge SOC(B) of the traction battery pack upon arrival of the at the designated destination may be calculated as a function of a starting state of charge SOC(A) of the traction battery pack at the vehicle origin, a battery capacity C, and a predicted total load current $\int_A^B I(t)dt$ for all vehicle electrical systems. In at least some embodiments, a predicted total energy usage for the motor vehicle to traverse from the vehicle origin to the vehicle destination may be calculated and compared to a current SOC of the traction battery pack. Responsive to a determination that the current SOC is not greater than the predicted total energy usage (i.e., insufficient battery charge), a second geospatial query may be conducted to identify an alternative route for driving a vehicle from its origin to the designated destination.

For any of the disclosed systems, methods, and vehicles, the control operation may include the vehicle navigation system's electronic display device displaying one or more alternative routes along with an indication that the battery pack's current SOC is insufficient for the motor vehicle to reach the vehicle destination using the designated route. In addition, or alternatively, an ADAS module operable to automate and/or modulate one or more driving operations of the motor vehicle may implement a memory-stored, vehicle-calibrated set of enhanced low-energy-consumption driving rules to help optimize battery usage. Optionally, an autonomous driving system module, which is operable to automate driving of the motor vehicle, may temporarily disable autonomous driving to help minimize battery usage. As yet a further option, a memory-stored map database may save a calculated total vehicle/motor energy usage in connection with a designated route. The vehicle navigation system's electronic display device may display each route with an indication of its corresponding total vehicle/motor energy usage.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
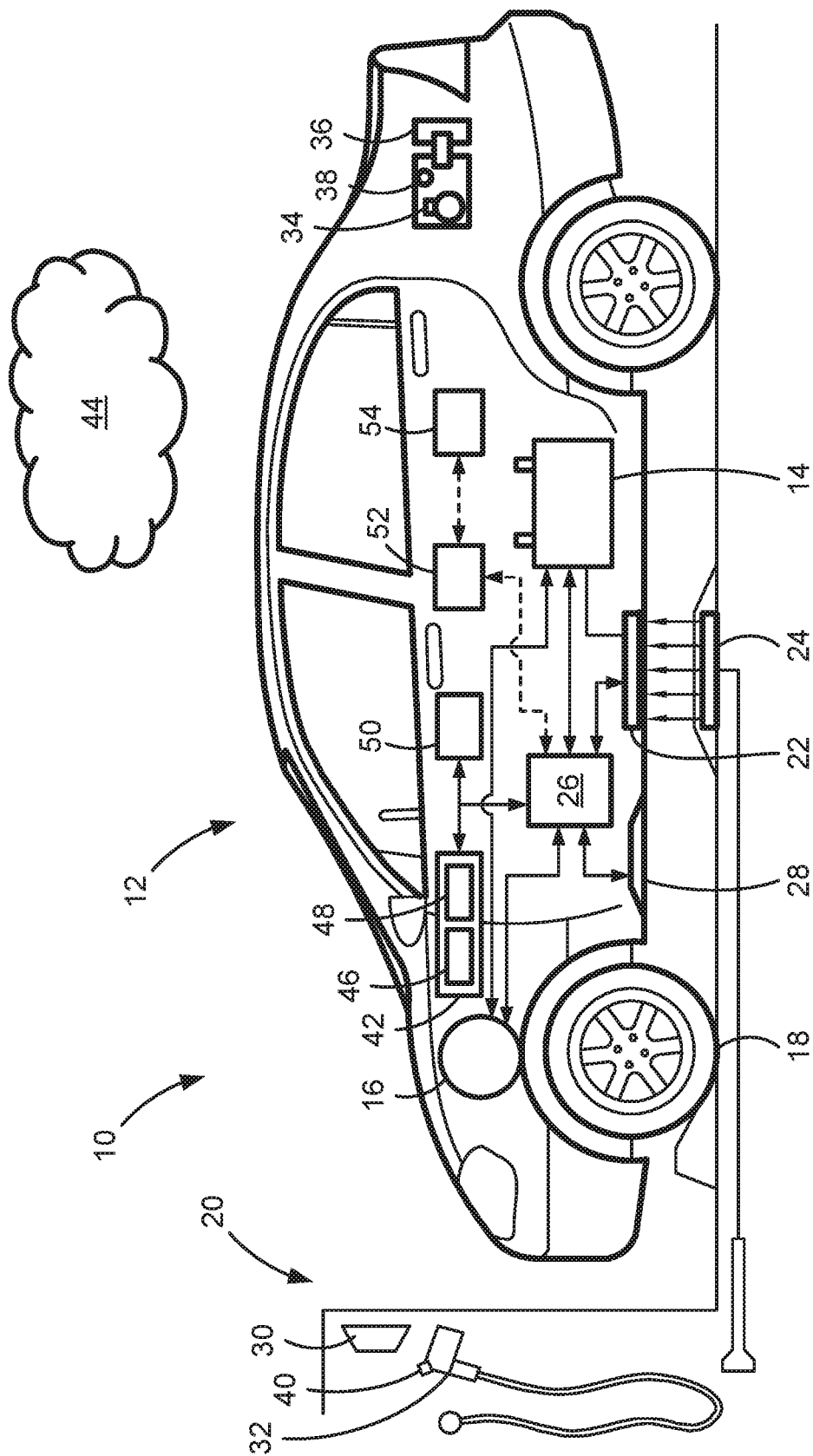
FIG. 1 is a partially schematic, side-view illustration of a representative electric-drive motor vehicle with a network of in-vehicle controllers, sensing devices, and communication devices for executing predictive charge planning and powertrain control in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these representative examples are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a normal driving surface.

Referring now to the drawings, wherein like reference numbers refer to like features throughout the several views, there is shown in FIG. 1 a schematic illustration of a representative automobile, which is designated generally at 10 and portrayed herein for purposes of discussion as a sedan-style, electric-drive (hybrid or electric) motor vehicle. Packaged within a vehicle body 12 of the automobile 10, e.g., within a passenger compartment, a trunk compartment, or a dedicated battery compartment, is a traction battery pack 14 that is electrically coupled to and powers one or more electric motor-generators 16 that operate to turn one or more of the vehicle's road wheels 18 and thereby propel the vehicle 10. The illustrated automobile 10—also referred to herein as "motor vehicle" or "vehicle" for short—is merely an exemplary application with which aspects and features of this disclosure may be practiced. In the same vein, implementation of the present concepts for the specific electric vehicle supply equipment (EVSE) illustrated in FIG. 1 should also be appreciated as an exemplary application of the disclosed concepts and features. As such, it will be understood that aspects and features of this disclosure may be applied to other types of EVSE, and implemented for any logically relevant type of motor vehicle. Moreover, only selected components of the vehicle and EVSE have been shown and will be described in additional detail herein. Nevertheless, the motor vehicles and EVSE architectures discussed below can include numerous additional and alternative features, and other commercially available peripheral components, for example, to carry out the various protocols and algorithms of this disclosure. Lastly, the drawings presented herein are not to scale and are provided purely for instructional purposes. Thus, the specific and relative dimensions shown in the drawings are not to be construed as limiting.

FIG. 1 is a simplified illustration of the electric-drive vehicle 10 docked at and operably coupled to a vehicle charging station 20 for recharging an onboard rechargeable energy source, such as a high-voltage direct current (DC) traction battery pack 14. Traction battery pack 14 may take on many suitable configurations, including an array of lead-acid, lithium-ion, or other applicable type of rechargeable electric vehicle batteries (EVB). To provide an operable coupling between the traction battery pack 14 and vehicle charging station 20, the vehicle 10 may include an inductive charging component 22, e.g., with an integrated induction coil, that is mounted to the underside of the vehicle body 12. This inductive charging component 22 functions as a wireless charging interface that is compatible with a wireless charging pad or platform 24, e.g., with an internal EMF coil, of the vehicle charging station 20. In the illustrated example, the wireless charging pad/platform 24 is located on the floor of the vehicle charging station 20, and is positioned in accordance with a "target location" that serves as a desired parking location, e.g., for purposes of efficient and effective wireless charging of the vehicle 10. In particular, FIG. 1 depicts the vehicle 10 parked in a location that helps to ensure the inductive charging component 22 is substantially or completely aligned in both lateral and longitudinal dimensions with the wireless charging pad 24. Put another way, the vehicle 10 in FIG. 1 is considered to be in proper fore-aft alignment and in proper starboard-port alignment with a designated target location to complete an inductive charging event for the vehicle 10.

The vehicle charging station 20 may employ any heretofore and hereinafter developed type of wired and wireless charging technology, including inductive charging, radio charging, and resonance charging, as some non-limiting examples. In accordance with electromagnetic induction charging technology, the representative wireless charging pad 24 of FIG. 1 may be activated with electric current to generate an alternating electromagnetic field proximate the inductive charging component 22. This magnetic field, in turn, induces an electric current in the inductive charging component 22 of the vehicle 10. The induced current may be filtered, stepped-down, and/or phase-shifted by in-vehicle electrical modulation circuitry to charge the traction battery pack 14 or any other energy source of the vehicle 10 (e.g., a standard 12V lead-acid starting, lighting, and ignition (SLI) battery, an auxiliary power module, etc.). As mentioned previously, the optimal wireless charging performance may be obtained when the inductive charging component 22 is properly aligned with the wireless charging pad 24.

Traction battery pack 14 stores energy that can be used for propulsion by the electric machine(s) 16 and for operating other vehicle electrical systems. The traction battery pack 14 is communicatively connected (wired or wirelessly) to one or more vehicle controllers, represented in FIG. 1 by electronic control unit (ECU) 26, that regulates the operation of various onboard vehicle components. Contactors controlled by the ECU 26, for example, may isolate the traction battery pack 14 from other components when opened, and connect the traction battery pack 14 to other components when closed. The ECU 26 is also communicatively connected to the electric motor-generator(s) 16 to control, for example, bi-directional transfer of energy between the traction battery pack 14 and each motor-generator 16. For instance, traction battery pack 14 may provide a DC voltage while the motor-generator(s) 16 may operate using a three-phase AC current; in such an instance, ECU 26 converts the DC voltage to a three-phase AC current for use by the motor-generator(s) 16. In a regenerative mode where the electric machine(s) 16 act as generators, the ECU 26 may convert three-phase AC current from the motor-generator(s) 16 to DC voltage compatible with the traction battery pack 14. The representative ECU 26 is also shown communicating with charging component 22, for example, to condition the power supplied from the vehicle charging station 20 to the battery pack 14 to help ensure proper voltage and current levels. The ECU 26 may also interface with the charging station 20, for example, to coordinate the delivery of power to the vehicle 10.

Vehicle charging station 20 of FIG. 1 also offers wired charging for electric vehicle 10 via a "plug-in" electrical connector 32, which may be one of a number of different commercially available electrical connector types. By way of non-limiting example, electrical connector 32 may be a Society of Automotive Engineers (SAE) J1772 (Type 1) or J1772-2009 (Type 2) electrical connector with single or split phase modes operating at 120 to 240 volts (V) with alternating current (AC) at up to 80 amperes (A) peak current for conductive vehicle charging. Furthermore, the charging connector 32 can also be designed to meet the standards set forth in International Electrotechnical Commission (IEC) 62196-3 Fdis and/or IEC 62196-2, as well as any other presently available or hereinafter developed standards. A charge port 34 accessible on the exterior of vehicle body 12 is a wired charging interface functioning as an electrical inlet into which electrical connector 32 may be plugged or otherwise mated. This port 34 enables a user to easily connect and disconnect electric vehicle 10 to/from a readily available AC or DC source, such as a public utility power grid via charging station 20. Charge port 34 of FIG. 1 is not limited to any particular design, and may be any type of inlet, port, connection, socket, plug, etc., that enables conductive or other types of electrical connections. A hinged charge port door (CPD) 36 on vehicle body 12 can be selectively opened and closed to access and cover the charge port 34, respectively.

As part of the vehicle charging process, the electric-drive vehicle 10 may monitor wired/wireless charging availability, wireless power quality, and other related issues that may affect vehicle charging. According to the illustrated example, the vehicle ECU 26 of FIG. 1 communicates with and receives sensor signals from a monitoring system, which may comprise one or more onboard "resident" sensing devices 28 of the vehicle 10 and/or one or more off-board "remote" sensing devices 30 of the vehicle charging station 20. In practice, this monitoring system may include a single sensor, or it may include a distributed sensor architecture with an assortment of sensors packaged at similar or alternative locations to that shown in the drawings. A CPD sensor 38 mounted by the charge port 34 may sense, and be polled or read by the vehicle's ECU 26 to determine, a door status—opened or closed—of the CPD 36. As another option, a latching button 40 that helps to physically attach and secure the electrical connector 32 to the charge port 34 may include an internal switch (e.g., an SAE S3 type switch) that functions as a sensing device to detect whether or not the electrical connector 32 is operatively connected to the charge port 34. There are numerous other types of sensing devices that can also be used, including, for example, thermal sensing devices, such as passive thermal infrared sensors, optical sensing devices, such as light and laser-based sensors, acoustic sensing devices, such as surface acoustic wave (SAW) and ultrasonic sensors, capacitive sensing devices, such as capacitive-based proximity sensors, etc.

The representative vehicle 10 of FIG. 1 may be originally equipped with a vehicle telecommunication and information ("telematics") unit 42 that wirelessly communicates (e.g., via cell towers, base stations and/or mobile switching centers (MSCs), etc.) with a remotely located or "off-board" cloud computing system 44. Acting as both a user-input device and a vehicle-output device, telematics unit 42 may be equipped with an electronic video display device 46 and assorted input controls 48 (e.g., buttons, knobs, switches, trackpads, keyboards, touchscreens, etc.). These telematics hardware components may function, at least in part, as a resident vehicle navigation system, e.g., to enable assisted and/or automated vehicle navigation, and as a human/machine interface (HMI), e.g., to enable a user to communicate with the telematics unit 42 and other systems and system components of the vehicle 10. Optional peripheral hardware may include a microphone that provides a vehicle occupant with means to input verbal or other auditory commands; the vehicle 10 may be equipped with an embedded voice-processing unit programmed with a computational speech recognition software module. A vehicle audio system with one or more speaker components may provide audible output to a vehicle occupant and may be either a stand-alone device dedicated for use with the telematics unit 42 or may be part of a general audio system.

With continuing reference to FIG. 1, telematics unit 42 is an onboard computing device that provides a mixture of services, both individually and through its communication with other networked devices. Telematics unit 42 may be generally composed of one or more processors, each of which may be embodied as a discrete microprocessor, an application specific integrated circuit (ASIC), a dedicated control module, etc. Vehicle 10 may offer centralized vehicle control via ECU 26 that is operatively coupled to one or more electronic memory devices 50, each of which may take on the form of a CD-ROM, magnetic disk, IC device, semiconductor memory (e.g., various types of RAM or ROM), etc., with a real-time clock (RTC). Long-range vehicle communication capabilities with remote, off-board networked devices may be provided via one or more or all of a cellular chipset/component, a navigation and location chipset/component (e.g., global positioning system (GPS) transceiver), or a wireless modem, all of which are collectively represented at 52. Close-range wireless connectivity may be provided via a short-range wireless communication device (e.g., a BLUETOOTH® unit or near field communications (NFC) transceiver), a dedicated short-range communications (DSRC) component, and/or a dual antenna, all of which are collectively represented at 54. The various communications devices described above may be configured to exchange data as part of a periodic broadcast in a Vehicle-to-Vehicle (V2V) communication system or a vehicle-to-everything (V2X) communication system, e.g., Vehicle-to-Infrastructure (V2I), Vehicle-to-Pedestrian (V2P), Vehicle-to-Device (V2D), etc.

Figure 2:
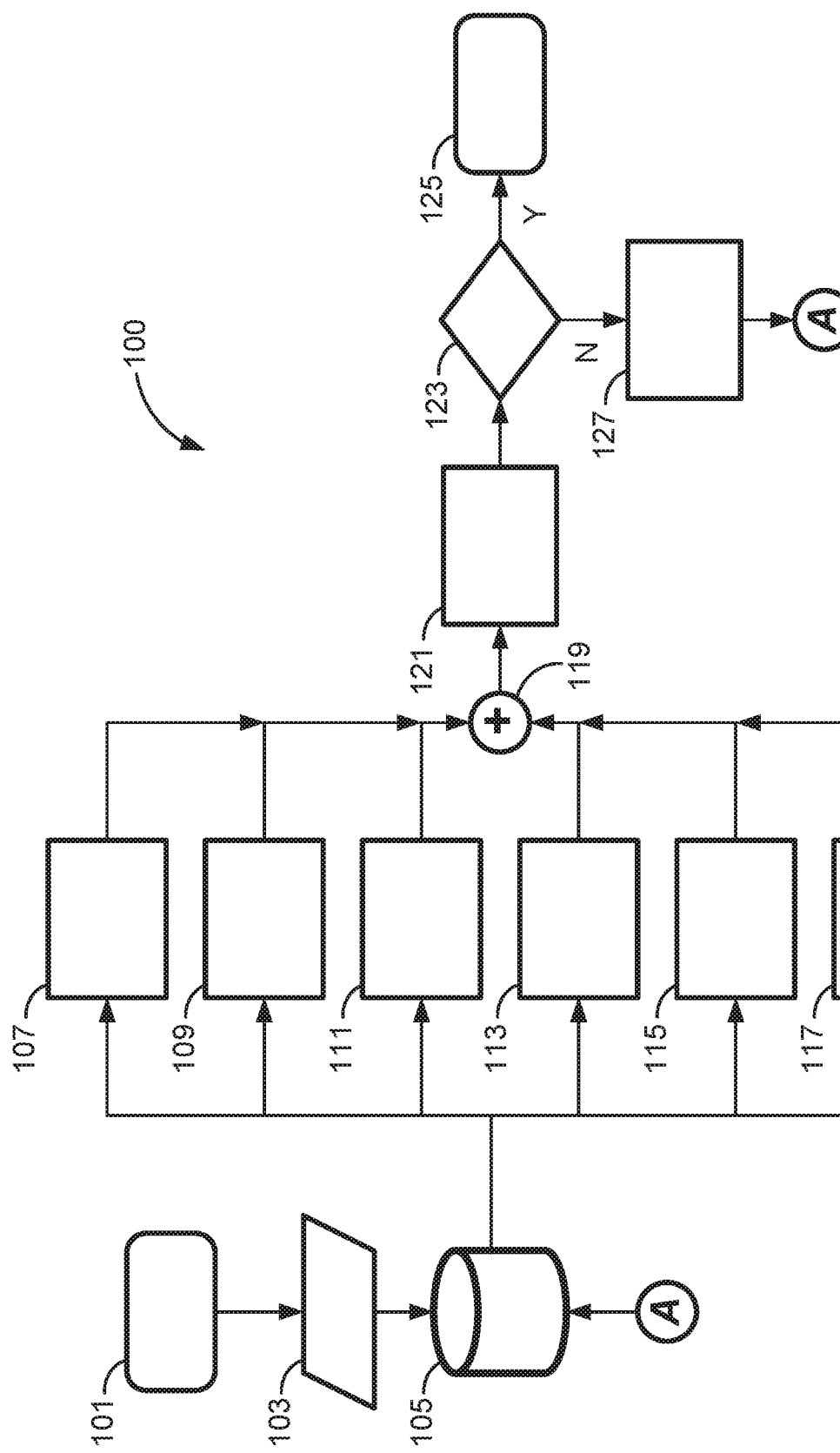
FIG. 2 is a flowchart illustrating a predictive-model based algorithm for estimating total electric-drive energy consumption to derive intelligent charge planning, which may correspond to memory-stored instructions executed by onboard or remote control-logic circuitry, programmable electronic control unit, or other computer-based device or network of devices in accord with aspects of the disclosed concepts.

With reference now to the flowchart of FIG. 2, an improved method or control strategy using ML-based predictive modeling for deriving total energy consumption of a full electric vehicle (FEV) for a designated route is generally described at 100 in accordance with aspects of the present disclosure. Some or all of the operations illustrated in FIG. 2 and described in further detail below may be representative of an algorithm that corresponds to processor-executable instructions that may be stored, for example, in main or auxiliary or remote memory, and executed, for example, by an on-board or remote controller, processing unit, control logic circuit, or other module or device, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 100 begins at terminal block 101 with processor-executable instructions for a programmable controller or control module or similarly suitable processor or server computer to call up an initialization procedure for a predictive charge planning protocol that provides more accurate EV travel range estimates, optimizes electrical system energy usage, and helps to increase battery operational life. This routine may be executed in real-time, continuously, systematically, sporadically and/or at regular intervals, for example, each 100 milliseconds, etc., during ongoing vehicle operation. As yet another option, terminal block 101 may initialize responsive to a user command prompt or a broadcast prompt signal received from a backend or middleware computing node tasked with collecting, analyzing, sorting, storing and distributing vehicle data. As part of the initialization procedure at block 101, for example, resident vehicle telematics unit 40 may execute a navigation processing code segment, e.g., to obtain vehicle data (e.g., geospatial data, speed, heading, acceleration, timestamp, etc.), and optionally display select aspects of this data to an occupant of the vehicle 10. The occupant my employ any of the HMI input controls 48 to then select a desired origin and/or destination for the vehicle. It is also envisioned that the ECU 26 or telematics unit 42 processors receive vehicle origin and vehicle destination information from other sources, such as a server-class computer provisioning data exchanges for the cloud computing system 44 or a dedicated mobile software application operating on a smartphone or other handheld computing device.

Once a vehicle origin (starting position) and a vehicle destination (ending position) are confirmed at process block 101, the method 100 executes a geospatial query at input/output block 103 to identify location-specific geographic information. By way of example, and not limitation, the query conducted at block 103 may utilize the vehicle's real-time location information (i.e., a set of GPS-generated geodetic datum) and temporal information (i.e., a vehicle timestamp) to identify a designated route for traversing from the vehicle origin to vehicle destination. Geospatial information may include, in some non-limiting examples, shoulder location data, road center location data, road boundary location and geometry data, intersection midpoint location data, etc. Rather than identify a single route option, the geospatial query of input/output block 103 may identify multiple preview routes corresponding to the vehicle's start and end positions. Method 100 thereafter accesses an OPENSTREETMAP® (OSM) data service 105 or similarly suitable mapping database to "lookup" road-level data associated with each route. This baseline "road-level" information may include the interconnecting segments that form a given route, a name for each road segment, a speed limit for each road segment, lane alignment information, traffic light locations, stop sign positions, gradients, etc.

After establishing a vehicle origin, destination and at least one designated/preview route, and then aggregating relevant road-level data and roadway traffic and disturbance data, the method 100 begins to implement eDrive energy consumption models, auxiliary device energy consumption models, autonomous device energy consumption models, etc., to build a holistic simulation of total vehicle energy consumption to reach the desired vehicle destination. Process block 107, for example, provides memory-stored, processor-executable instructions to calculate a predicted motor energy usage of a traction motor (e.g., electric motor-generator(s) 16 of FIG. 1) to propel an electric vehicle (e.g., electric-drive motor vehicle 10) across a given "preview" route. Predicted motor speed ω is a function of a predicted vehicle speed/speeds Vp and a motor speed to vehicle speed ratio k:

$$\omega = k(r, Gr)Vp$$

where k is a function of gear ratio Gr and tire radius r. It may be desirable, for at least some applications, to utilize deep learning neural network (DNN) techniques for a driver model to predict vehicle speed, desired propulsion torque, and other dynamic driving behaviors for a given route. It should be appreciated, however, that other forms of driver models may be utilized, including Long Short Term Memory (LSTM) neural network models, statistical models (e.g., Markov chain), Hidden Markov Model (HMM), nonlinear regression models, etc.

From a predicted desired propulsion torque $Tq_{des}$ estimated through a ML-based driver model as a function of pedal position, $Tq_{des}=f(pedal)$, the system is able to calculate a predicted motor torque $T_{MGU}(A:B)$ for the preview route under investigation. Through integration, the system calculates a predicted total motor energy usage as $E_{MGU}$:

$$E_{MGU} = \int_A^B \omega T_{MGU} dt - E_{RGN}$$

where A and B are indicia of the vehicle origin and vehicle destination, respectively, and $E_{RGN}$ is a total regenerated energy for the preview route. During a braking operation, ECU 26, e.g., through implementation of a motor control module (MCM) and battery control module (BCM), may operate the electric motor(s) 16 to recover energy from slowing the vehicle 10 and store the energy in the EVB traction battery pack 14 through a regenerative braking operation. Actual motor energy usage may be higher than a predicted total motor energy usage $E_{MGU}$ since the motor is likely not 100% efficient. To correct for this issue, predicted total motor energy usage $E_{MGU}$ can be divided by an η term, which is a function of motor speed/torque.

At process block 109, the method 100 calculates an inverter/converter energy loss as a function of the predicted motor speed and predicted motor torque. Such inverter/converter energy loss results from the electrified powertrain employing a power inverter module or an AC-DC converter to operate the traction motor and battery pack during the designated route. Vehicle 10 may employ a power inverter module to modulate a DC voltage received from the traction battery pack 14, and output an AC voltage suitable for powering the electric motor(s) 16. By comparison, an AC-DC converter may be used as a battery charger or onboard charging module (OBCM) to convert an AC charging voltage from an off-board AC power supply (e.g., vehicle charging station 20) or the motors 16 operating in regenerative mode into a DC voltage suitable for use by the battery pack and other DC devices. Method 100 then calculates a motor energy loss as a function of predicted motor speed and torque at process block 111. Motor energy losses may result from several factors, such as: (1) resistive losses in the stator windings; (2) hysteresis losses in the stator cores; and (3) uncaptured high-frequency electrical energy reflected back from the coils.

With continuing reference to FIG. 2, an estimated total energy usage of a vehicle heating, ventilation and air conditioning (HVAC) system is calculated at process block 113. For example, the motor vehicle 10 may employ a refrigerant-based heat pump for cooling air injected into the engine intake system or passenger compartment, while electrically resistant metallic heat strips may be provided for heating air. In addition to powering the heat pump and heat strips, electrical energy is consumed to operate blowers or fans that circulate the heated/cooled air into the passenger compartment and other desired sections of the vehicle body 12. Total vehicle energy consumption may also account for auxiliary device energy needed to power peripheral electronics operated over the duration of the designated route at process block 115. Such auxiliary "non-vehicle-propulsion" equipment may include a DC-DC converter for converting high voltage power from the traction battery pack to a low voltage power for running various electrical components in the vehicle, such as a radio, a center console display, an electronic instrument cluster, etc. In this regard, a 12V battery load may be reserved for operating any of the non-propulsion peripheral hardware present in the vehicle, including auxiliary (aux) input jacks provided throughout the passenger compartment as standardized communication ports for interfacing an occupant's handheld electronics and personal computing devices with the motor vehicle 10. In addition to the electrical loads enumerated above, the method 100 may also account for the energy usage of electronic devices employed to provision autonomous driving and Advanced Driver Assistance System (ADAS) functionality at process block 117. These loads may include dynamics sensors, radar sensing components, Lidar, cameras, computer processors, etc.

Method 100 continues to summation operation 119 with processor-executable instructions to aggregate all predicted values of the ML-based energy consumption models executed at process blocks 107, 109, 111, 113, 115 and 117 and thereby derive a predicted total energy usage Ep(A:B). Once amassed, total energy usage Ep(A:B) is applied at process block 121 to calculate an estimated remaining battery energy ΔE of the traction battery pack 14 when the motor vehicle 10 reaches its destination. Remaining battery energy ΔE may be calculated as:

$$\Delta E = \frac{Q}{100}\int_{a}^{SOC(A)} V_{oc}(SOC)dSOC - Ep(A:B) - E(T)_{battloss}$$

where a is a calibrated minimum battery SOC to maintain a traction battery pack in a healthy state, SOC(A) indicates a current SOC at a current location A, $V_{OC}$(SOC) is an open circuit voltage of the traction battery pack as a function of SOC, $E(T)_{battloss}$ is a battery energy loss of the traction battery pack as a function of battery temperature T, and Q is the battery pack energy capacity. In this example, the first integration $\int_{a}^{SOC(A)} V_{oc}(SOC)dSOC$ calculates an estimated remaining battery energy of the traction battery pack 14 at the vehicle's current location A or, when not synonymous, at the desired route's starting position, used all the way to the minimum energy a being sustained. Alternatively, an estimated remaining battery energy ΔE may be calculated as:

$$\Delta E = (SOC(A) - a)Q - Ep(A:B) - E(T)_{battloss}$$

If the SOC of a battery is known, the battery energy in terms of Ampere-hours (Ah) may be calculated as a Total Capacity *% SOC. Battery open circuit voltage $V_{OC}$ is a strong function of SOC, which makes the integral nonlinear; open circuit voltage $V_{OC}$ may be considered to have a one-to-one relationship with SOC.

After calculating the remaining battery energy ΔE, method 100 continues to decision block 123 to determine if there is a sufficient amount of battery power for the motor vehicle 10 to reach the desired destination using the designated route. This determination may generally comprise ascertaining whether or not the traction battery pack's current SOC is greater than the predicted total energy usage by at least a calibrated percentage or value. In a more specific example, decision block 123 will ascertain whether or not the predicted remaining battery energy ΔE is greater than a calibrated charge sustaining value Thd, which is derived experimentally to prevent a traction battery pack from fully discharging and, thus, helping to maintain a longer battery life. Responsive to a determination that the remaining battery energy ΔE is in fact greater than the calibrated charge sustaining value Thd and, thus, there is sufficient battery power for the motor vehicle 10 to reach the desired destination using the designated route (block 123=YES), the method 100 may proceed to terminal block 125 and thereafter terminate without taking any preventative or remediating action. The method 100 may thereafter loop back to terminal block 101 and run in a continuous loop.

Conversely, upon determining that the remaining battery energy ΔE is not greater than the calibrated charge sustaining value Thd and, thus, there is an insufficient amount of battery power for the motor vehicle 10 to reach the desired destination using the designated route (block 123=NO), the method 10 proceeds to process block 127 with memory-stored, processor-executable instructions for the resident vehicle controller 26 to automatically issue one or more command signals to a resident vehicle subsystem to execute one or more preventative or remediating control operations. For instance, the method 100 may return to OSM data service 105 and retrieve road-level data associated with one or more alternative routes ("reroutes"), each of which may be evaluated as a respective preview route in accordance with the methodology 100 of FIG. 2. Vehicle telematics unit 42 may concomitantly display the original designated route with one or more of the alternative routes contemporaneous with an indication that the current SOC is insufficient for the motor vehicle to reach the destination using the designated route.

As an additional or alternative option, process block 127 may provide instructions for the ECU 26 to coordinate with a powertrain control module (PCM) to implement a set of enhanced low-energy-consumption driving rules, such as setting the vehicle 10 into "eco-driver mode" that limits vehicle speed and motor torque. In this regard, the ADAS module may automate one or more predetermined driving maneuvers to help preserve battery charge, including initiating adaptive cruise control (ACC) set at a calibrated speed that has been verified to optimize battery usage. It may be desirable, for at least some applications, to disable full autonomous driving of the motor vehicle for the duration of the route. This will eliminate the additional toll placed on a vehicle's electrical system to power the various sensors, hardware components and processors necessary to automate vehicle driving. Total motor/vehicle energy usage for each preview route may be saved in a resident or remote memory-stored map database; optionally, the resident vehicle navigation system's display device may display each route with an indication of its corresponding total motor/vehicle energy usage.

Figure 3:
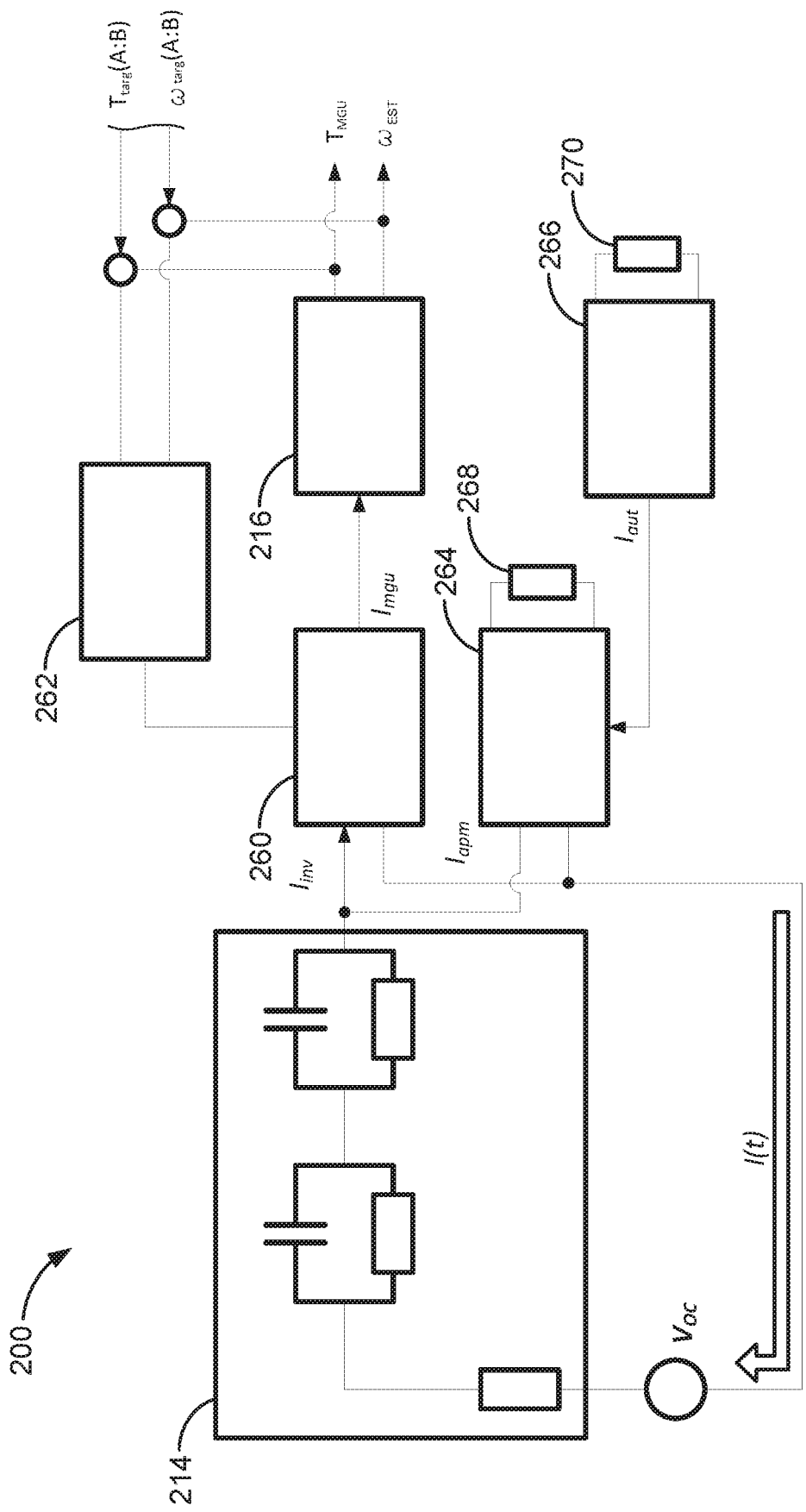
FIG. 3 is a flowchart illustrating a common-model based algorithm for estimating total electric-drive energy consumption to derive intelligent charge planning, which may correspond to memory-stored instructions executed by onboard or remote control-logic circuitry, programmable electronic control unit, or other computer-based device or network of devices in accord with aspects of the disclosed concepts.

With reference now to the flowchart of FIG. 3, an improved method or control strategy using common-model based algorithms for estimating total electric-drive energy consumption for deriving intelligent charge planning is generally described at 200 in accordance with aspects of the present disclosure. Some or all of the operations illustrated in FIG. 3 and described in further detail below may be representative of an algorithm that corresponds to processor-executable instructions that may be stored, for example, in main or auxiliary or remote memory, and executed, for example, by an on-board or remote controller, processing unit, control logic circuit, or other module or device, to perform any or all of the above or below described functions associated with the disclosed concepts. It should be recognized that the order of execution of the illustrated operation blocks may be changed, additional blocks may be added, and some of the blocks described may be modified, combined, or eliminated.

In general, method 200 predicts total vehicle energy consumption of an EV to complete a designated route using a common EV model that is calibrated to a specific vehicle platform of the EV under analysis. The method 200 attempts to simulate the entire electrical drive system, such as an electric vehicle battery (EVB) 214, electric traction motor(s)

216, converter and inverter module 260, motor controller 262, auxiliary power module 264, and autonomous driving power module 266—with all component efficiency losses. Total current load of the EV may be an aggregation of inverter current $I_{inv}$, auxiliary device current $I_{apm}$, motor current $I_{mgu}$, and autonomous driving device current $I_{aut}$. The auxiliary power module (APM) 264 of FIG. 2, for example, models current $I_{apm}$ to a 12V electrical load, an AC/HC (heating and air conditioning) system, power for DC-DC converter, etc., all of which are schematically illustrated at 268 in FIG. 3. The simulated EVB system 214 provides power to the traction motor(s) 216 through the inverter/converter module 260, to the APM 264, and to all sensor, sensor fusion, and processing electronics 270 linked to the autonomous driving power module 266. A target motor torque $T_{targ}$(A:B) and a target motor speed $\omega_{targ}$(A:B) operate as system input parameters, with an estimated motor torque $T_{MGU}$ and an estimated motor speed $\omega_{est}$ operating as system control outputs.

For method 200 of FIG. 3, an ML-based driver model, which may take on any suitable form described herein, is used to predict a target motor torque $T_{targ}$(A:B) and a corresponding target motor speed $\omega_{targ}$(A:B) for an EV to complete a preview route from starting to ending position. The schematically illustrated architecture employs the motor controller 262 to simulate the load current $I_{inv}$ to drive the inverter/converter module 260 and the load current $I_{mgu}$ to operate the traction motor(s) 216. In addition, a battery control module of the EVB 214 is employed to simulate a total load current I(t) to drive the inverter/converter module 260, motor(s) 216, APM 264, and autonomous driving power module 266. After deriving the total load current to drive the EV on the preview route from origin to destination, total EV load current I(t) can be used to predict the battery state of charge SOC(B) remaining at the vehicle destination:

$$SOC(B) = SOC(A) - \frac{1}{C} \int_A^B I(t)dt$$

where SOC(A) is a starting state of charge of the traction battery pack at the vehicle origin, C is a battery capacity, and $\int_A^B I(t)dt$ is the predicted total load current.

Figure 4:
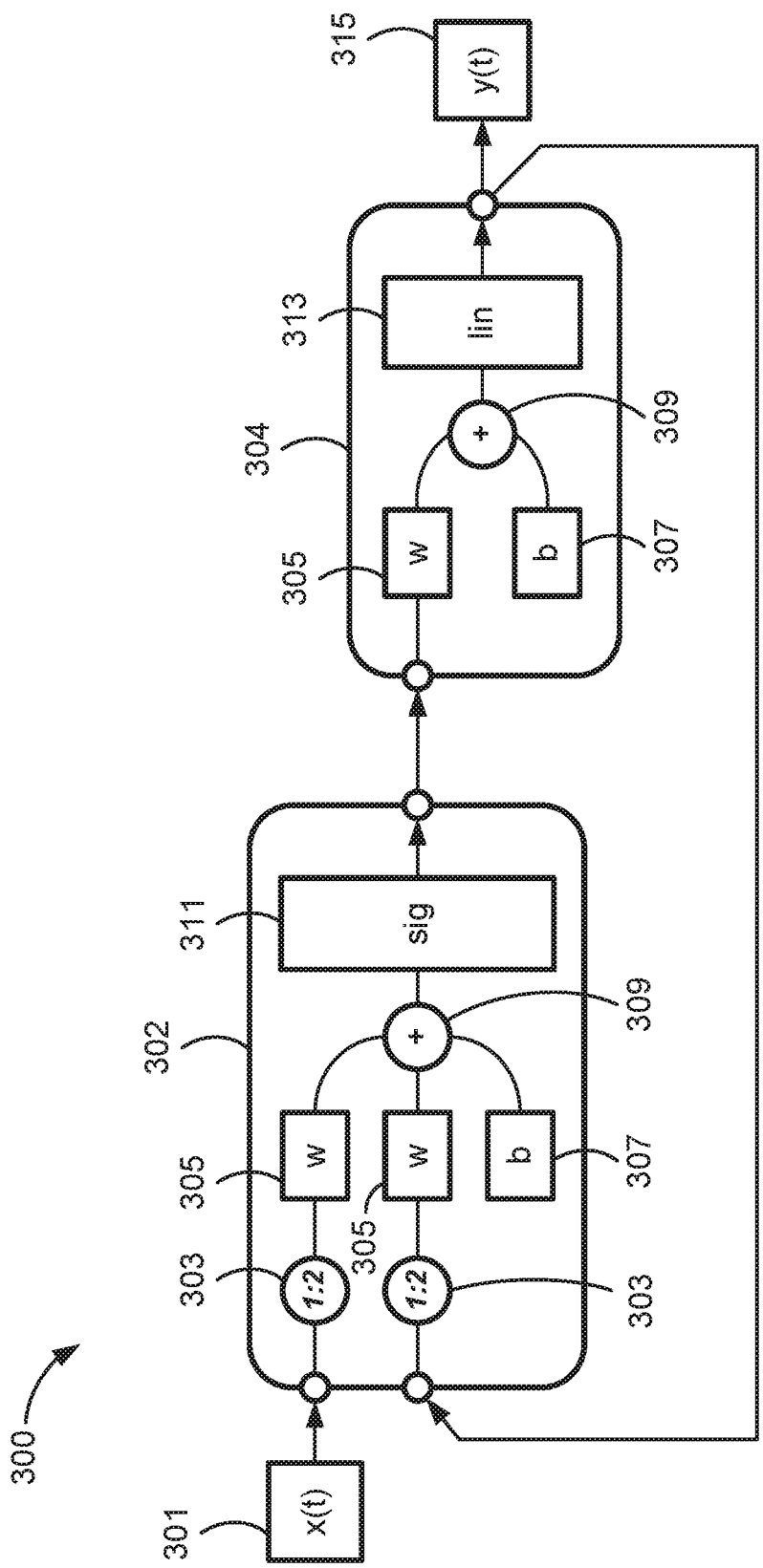
FIG. 4 is a flowchart illustrating a representative RNN architecture using deep-learning driver model algorithms for predictive electric-drive powertrain control, which may correspond to memory-stored instructions executed by onboard or remote control-logic circuitry, programmable electronic control unit, or other computer-based device or network of devices in accord with aspects of the disclosed concepts.

With reference now to the work flowchart of FIG. 4, an improved method or control strategy using deep-learning driver model algorithms for predictive HEV powertrain control is generally described at 300 in accordance with aspects of the present disclosure. Some or all of the operations illustrated in FIG. 4 and described in further detail below may be representative of an algorithm that corresponds to processor-executable instructions that may be stored, for example, in main or auxiliary or remote memory, and executed, for example, by an on-board or remote controller, processing unit, control logic circuit, or other module or device, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 300 of FIG. 4 uses machine learning driver models for predictive powertrain control in order to help optimize energy usage and efficiency for hybrid vehicles, with marked improvements for mild hybrid vehicle powertrains. Deep structured hierarchical learning ("deep learning") is employed to predict driver behavior, which in turn is used to derive a drive cycle profile that is defined, at least in part, by a preview route and available traffic information, geopositional and geospatial data, roadway map information, etc. Key sensor-generated propulsion data, along with route and traffic information, are collected by a cloud computing resource service or similarly suitable high-speed, high power processing device. The drive cycle profile may include, in some non-limiting examples, a predicted vehicle speed $V_p(t)$, a predicted propulsion torque $T_p(t)$, a predicted steering angle $S_p(t)$, and/or predicted accelerator/brake pedal positions $A_p(t)$ and $B_p(t)$ for a given preview route of a host vehicle. A drive cycle profile may optionally include transmission gear, motor torque, engine torque, etc. Predictive powertrain control helps to optimize fuel consumption and battery state of charge (SOC), constrained by scheduling extended stop/start and power-split operations for mild HEV, plugin hybrid, or full HEV based on predicted cycles.

According to the illustrated example, a cloud computing resource service maintains a high-definition (HD) roadway map database and systematically amasses traffic information, crowd-sourced vehicle sensor and actuator data, real-time vehicle dynamics and operating data for a host vehicle (i.e., the vehicle under investigation), front vehicle speed data (i.e., speed of a vehicle directly in front of the host vehicle), etc., for a given preview route. Data capture events may be initiated as part of a five, ten or twenty-minute prediction cycle, or as part of a five, ten or twenty-mile prediction cycle, for example. Using a Recurrent Neural Network (RNN), the system identifies maximum speed limit data, traffic light data, roadway gradient data, stop sign location data, host and front vehicle speed data, road disturbance data (e.g., construction, collision, rain, pot holes, etc.), traffic flow data, V2X and V2V data to derive the ML driver and powertrain models for predictive powertrain control. The cloud computing resource service utilizes big data processing techniques for capturing, storing, querying, batch analyzing, and updating sets of data that are significantly voluminous and complicated such that traditional data-processing application software and resident vehicle hardware are generally inadequate to handle the data's size and complexity. Big data processing may be used for data preprocessing, information fusion, feature extraction for each driving scenario, data synchronization (e.g., discrete, continuous, etc.), and drive model learning.

Based on select segments of the collected data, the cloud computing resource service develops and trains a driver model using a DNN to simulate a driver's behavior in order to predict how that driver will operate an HEV or EV for a given preview route. When developing a training route, the DNN may aggregate a complete data set for a predetermined training route, effectively collecting information signals determined to cover an entire set of relevant scenarios. If the requisite information is only partially available, the trained model can be learned to adapt to future driving scenarios. Once a driver model is trained for a particular driver, the driver's accelerator and brake pedal positions and steering angle may be predicted, along with vehicle speed and propulsion torque, for a future (10-second, 10-minute, 20-minute) drive on a preview route based on the desired destination and the corresponding road conditions. For at least some implementations, the cloud computing resource service sends an ML-generated driver model to the respective vehicle or, alternatively, only sends drive cycle profile information to the vehicle for subsequent powertrain control.

For a deep-learning RNN driver model, traffic signal lamp events (e.g., red, yellow, green, etc.) may be transformed into respective digital signals with a different magnitude for each event. Likewise, each stop sign location may be transformed to a digital signal, e.g., with a zero (0) value, to indicate a stop. In this regard, turn signals may be transformed into digital values assigning, for example, 10 to a no turn, 6 to a larger radius turn, 3 to a smaller radius turn, etc. Once transformed, the signals are synchronized and the digitized traffic light/stop sign/turn signals are then defined, e.g., in a 10-second travel time or an 80-meters travel distance before their exact locations. As an example:

Input_$x(t)$=[$V$spd_limit grade turns siglamp stop traffic flow];

Output_$y(t)$=[$V$spd pedal]

where Input $x(t)$ is an input vector, Output_$y(t)$ is an output signal, Vspd_limit is a vehicle speed limit as a function of time, grade is a preview route grade elevation as a function of time, turns are the transformed turn signals, siglamp are the transformed traffic signals, stop are the transformed stop signs, and traffic flow is a preview route traffic flow as a function of time.

Continuing with the above discussion, a recurrent neural network using a nonlinear auto-regressive model can be expressed as:

$y(t)=f(y(t-1), \ldots, y(t-d), x(t-1), \ldots, (t-d))$ and realized by the DNN. In the representative RNN architecture using a nonlinear auto-regressive model portrayed in FIG. 4, there are 10 neurons in the hidden layer, and one neuron in the output layer. Element 301 indicates a base input vector, e.g., $x(t)$=[$x1(t)$ $x2(t)$, . . . $xn(t)$], with operations 303 defining a number of time-delayed signals used in training (e.g., "1:2" indicates a two-step time delay). Operations 305 of the RNN place weights w on each input signal, whereas operation 307 adds a bias value b to each input signal. After executing a summation operation (+) at 309, a neuron in the form of a sigmoid function sig is executed at 311. Block 302 represents a hidden layer of a neural network, whereas block 304 represents an output layer of the neural network. A linear function lin is performed at block 313 to provide the output vector $y(t)$ at block 315.

It may be desirable, for at least some applications, to employ a deep learning RNN driver model using a perceived vehicle speed to reduce input demission in the model. By way of example, when a driver visually perceives a turn, a stop sign, a yellow-turned-red traffic signal, a red-turned-green traffic signal, etc., the driver may interpret a final desired or perceived driving speed. Driver-perceived inputs are incorporated into a driver model as follows:

Input_$x(t)$=[per_$v$_lim grade pedal$(k-1)v$spd$(k-1)$];

Output_$y(t)$=[$v$spd$(k)$pedal$(k)$]

for a RNN using a nonlinear auto-regressive model:

$y(t)=f(y(t-1), \ldots, y(t-d), x(t-1), \ldots, (t-d))$

The above methodology may be implemented to provide a predictive vehicle speed and a predictive vehicle torque on almost any predefined route, irrespective of route length.

A Short-Distance Driver Model may be particularly suited to predicting how a driver will accelerate or decelerate a vehicle, as well as how they will follow another vehicle, on a given preview route. Short-distance driver tendency modeling and learning may process a driver's past driving trajectory to learn a specific driver's driving style, such as predicted acceleration and deceleration rates, vehicle following gap distance, reaction times, distances to traffic control devices, cruise speed control tendencies, etc. Predicted acceleration/deceleration rate may be achieved by first calculating a derivative of a vehicle speed trajectory, then calculating maximum acceleration and deceleration rates for each segment. Using this information, the Short-Distance Driver Model learns maximum (and minimum) acceleration and deceleration rates. A predicted vehicle following gap distance may be achieved by using in-vehicle sensing (e.g., Lidar or radar data) to calculate a following gap distance and, from this data, calculate an average following gap distance. Using this information, the Short-Distance Driver Model learns the average gap as the driver's gap preference. As yet a further option, a predicted driver reaction time and/or distance to a traffic control device may be derived by detecting conditions that will likely cause a driver stoppage, such as red light or a stop sign. A respective distance to each target is ascertained when the driver starts to decelerate, and the Short-Distance Driver Model learns an average distance to a complete stop after the driver begins to decelerate.

After predicting a desired vehicle speed and torque profile for a given preview route, an engine control module (ECM) and powertrain control module (PCM) can optimize HEV powertrain operation by splitting propulsion torque (in any logical ratio) between engine torque output and motor torque output to help reduce fuel consumption. In this manner, HEV control for production vehicles may be calibrated as reactive, e.g., to instantaneous vehicle speed and torque demand, as well as anticipatory, e.g., to predicted vehicle speed and torque demand, to help achieve energy efficiency with SOC control for a given travel route. By using a DNN driver model, the vehicle controller is able to predict how a particular driver will likely operate a vehicle with a given vehicle mass and concomitantly generate a real-time predictive drive cycle for a predicted speed and predicted torque. With these predicted values, the ECM/PCM can optimize overall HEV energy consumption by minimizing propulsion energy consumption by splitting driver torque between engine torque and motor torque.

Predictive drive cycle-based hybrid optimization may be achieved by optimizing the following cost function:

$$SOC(0) = SOC(T) + \varepsilon$$

$$Tq_{des} = Tq_{eng} + Tq_{MGU}$$

$$\frac{dSOC}{dt} = \frac{P_{batt}(Tq_{MGU}, N_{MGU})}{V_L}$$

$$SOC_{min} < SOC < SOC_{max}, P_{batt_{min}} < P_{batt} < P_{batt_{max}},$$

$$P_{MGU_{min}} < P_{MGU} < P_{MGU_{max}}, P_{eng_{min}} < P_{eng} < P_{eng_{max}}$$

subject to the constraints:

$$J = \min \int_0^T \left( BSFC(\omega_{eng}, T_{eng}) P_{eng}(\omega_{eng}, T_{eng}) + s \cdot f_p \frac{P_{batt}}{Q_{LHV}} \right) dt$$

$$= \min \oint_{V_p(t), A_p(t)} \left( BSFC(\omega_{eng}, T_{eng}) P_{eng}(\omega_{eng}, T_{eng}) + s \cdot f_p \frac{P_{batt}}{Q_{LHV}} \right) dt$$

$$s = s(V_p(t), A_p(t), SOC(0))$$

where s is a fuel equivalence factor (electrical energy to fuel equivalence), BSFC is a brake-specific fuel consumption factor, $\omega_{eng}$ is an engine speed, $T_{eng}$ is an engine torque, $P_{eng}$ is an engine power, $P_{batt}$ is a battery power, $Q_{LHV}$ is a lower heating value of fuel, $V_p$ is a predicted vehicle speed, $A_p$ is a predicted accelerator pedal position, SOC(0) is an initial battery state of charge, and $f_p$ is a penalty function to disable motor drive when SOC (state of charge) reaches minimum or maximum values. Brake-specific fuel consumption is an indicator of ICE fuel consumption efficiency, and ε is an indicator of a charge sustaining or a charge depleting state. P(*,*) is indicative of engine power as a function of engine speed and torque, where engine speed may be back-calculated from vehicle speed and drivetrain ratio. In addition, $T_{qeng}$ is a predicted desired engine torque, $P_{MGU}$ is a motor power, $\omega_{MGU}$ is a motor speed, $T_{qMGU}$ is a predicted desired motor torque, and $T_{qdes}$ is a predicted torque from driver model.

Aspects of this disclosure may be implemented, in some embodiments, through a computer-executable program of instructions, such as program modules, generally referred to as software applications or application programs executed by an onboard vehicle computer or a distributed network of resident and remote computing devices. Software may include, in non-limiting examples, routines, programs, objects, components, and data structures that perform particular tasks or implement particular data types. The software may form an interface to allow a resident vehicle controller or control module or other suitable integrated circuit device to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network architectures, including multiprocessor systems, microprocessor-based or programmable-consumer electronics, minicomputers, mainframe computers, master-slave, peer-to-peer, or parallel-computation frameworks, and the like. In addition, aspects of the present disclosure may be practiced in distributed-computing environments where tasks are performed by resident and remote-processing devices that are linked through a communications network. In a distributed-computing environment, program modules may be located in both onboard and off-board computer-storage media including memory storage devices. Aspects of the present disclosure may therefore, be implemented in connection with various hardware, software or a combination thereof, in a computer system or other processing system.

Any of the methods described herein may include machine-readable instructions for execution by: (a) a processor, (b) a controller, and/or (c) any other suitable processing device. Any algorithm, software, control logic, protocol, or method disclosed herein may be embodied in software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, there are many other methods for implementing the example machine readable instructions that may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for controlling operation of an electric-drive motor vehicle, the electric-drive motor vehicle including a traction motor operable to propel the motor vehicle and a resident vehicle controller programmed to regulate operation of the traction motor, the method comprising:
   determining, via the resident vehicle controller, a vehicle origin and a vehicle destination for the motor vehicle;
   conducting a geospatial query to identify a designated route corresponding to the vehicle origin and vehicle destination;
   receiving, from a memory-stored map database, road-level data associated with the designated route;
   determining, based on the road-level data and roadway traffic and disturbance data for the designated route, a predicted motor speed of the traction motor for the designated route;
   estimating a predicted motor torque of the traction motor by applying a machine-learning driver model as a function of accelerator pedal position to the predicted motor speed;
   integrating the predicted motor torque to calculate a total motor energy usage for the traction motor to propel the motor vehicle across the designated route from the vehicle origin to the vehicle destination; and
   transmitting, via the resident vehicle controller, a command signal to a resident vehicle subsystem to execute a control operation based on the total motor energy usage.

2. The method of claim 1, wherein the motor vehicle further includes a power inverter module and/or an AC-DC converter each operable to modulate a voltage transmitted to or from the traction motor, the method further comprising:
   calculating an inverter/converter energy loss as a function of the predicted motor speed and the predicted motor torque for the designated route,
   wherein the command signal to execute the control operation is further based on the inverter/converter energy loss.

3. The method of claim 1, further comprising:
   calculating a motor energy loss of the traction motor as a function of the predicted motor speed and the predicted motor torque for the designated route,
   wherein the command signal to execute the control operation is further based on the motor energy loss.

4. The method of claim 1, further comprising:
   calculating an estimated auxiliary device energy usage for one or more in-vehicle electronic devices operated during the designated route,
   wherein the command signal to execute the control operation is further based on the estimated auxiliary device energy usage.

5. The method of claim 1, further comprising:
calculating an estimated autonomous-driving electronics energy usage for one or more in-vehicle sensors, cameras and/or processors operated during the designated route,
wherein the command signal to execute the control operation is further based on the estimated autonomous-driving electronics energy usage.

6. The method of claim 1, wherein integrating the predicted motor torque includes determining the total motor energy usage as $E_{MGU}$, the total motor energy usage $E_{MGU}$ being calculated as:

$$E_{MGU} = \int_A^B \omega T_{MGU} dt - E_{RGN}$$

where $\omega$ is the predicted motor speed, $T_{MGU}$ is the predicted motor torque, A and B are indicia of the vehicle origin and vehicle destination, respectively, and $E_{RGN}$ is a total regenerated energy.

7. The method of claim 1, wherein the motor vehicle further includes a traction battery pack operable to power the traction motor, the method further comprising determining a remaining battery energy $\Delta E$ of the traction battery pack when the motor vehicle reaches the vehicle destination, the remaining battery energy $\Delta E$ being calculated as:

$$\Delta E = \int_a^{SOC} V_{oc} dSOC - Ep(A:B) - E(T)_{battloss}$$

where a is a minimum state of charge (SOC) to maintain the traction battery pack in a healthy state, $V_{OC}$ is an open circuit voltage of the traction battery pack, $Ep(A:B)$ is a predicted total energy usage, and $E(T)_{battloss}$ is a battery energy loss of the traction battery pack as a function of battery temperature T.

8. The method of claim 1, further comprising:
calculating, based on the total motor energy usage, a predicted total load current for the motor vehicle to traverse the designated route from the vehicle origin to the vehicle destination,
wherein the command signal to execute the control operation is further based on the predicted total energy usage.

9. The method of claim 8, wherein the motor vehicle further includes a traction battery pack operable to power the traction motor, the method further comprising determining a remaining state of charge SOC(B) of the traction battery pack, the remaining state of charge SOC(B) being calculated as:

$$SOC(B) = SOC(A) - \frac{1}{C} \int_A^B I(t) dt$$

where SOC(A) is a starting state of charge of the traction battery pack at the vehicle origin, C is a battery capacity, and $\int_A^B I(t)dt$ is the predicted total load current.

10. The method of claim 1, wherein the motor vehicle further includes a traction battery pack operable to power the traction motor, the method further comprising:
calculating, based on the total motor energy usage, a predicted total energy usage for the motor vehicle to traverse from the vehicle origin to the vehicle destination;
determining if a current state of charge (SOC) of the traction battery pack is greater than the predicted total energy usage; and
responsive to a determination that the current SOC is not greater than the predicted total energy usage, conducting a second geospatial query to identify an alternative route corresponding to the vehicle origin and vehicle destination.

11. The method of claim 10, wherein the resident vehicle subsystem includes a vehicle navigation system with an electronic display device, and wherein the control operation includes displaying, via the electronic display device, the alternative route contemporaneous with an indication that the current SOC is insufficient for the motor vehicle to reach the vehicle destination using the designated route.

12. The method of claim 1, wherein the resident vehicle subsystem includes an Advanced Driver Assistance System (ADAS) module operable to govern driving of the motor vehicle, and wherein the control operation includes implementing a set of enhanced low-energy-consumption driving rules.

13. The method of claim 1, wherein the resident vehicle subsystem includes an autonomous driving system module operable to automate driving of the motor vehicle, and wherein the control operation includes disabling automated driving of the motor vehicle.

14. The method of claim 1, wherein the resident vehicle subsystem includes a vehicle navigation system with an electronic display device, and wherein the control operation includes saving, in a memory-stored map database, the total motor energy usage in connection with the designated route and displaying, via the electronic display device, the designated route with an indication of the total motor energy usage.

15. An electric-drive motor vehicle comprising:
a vehicle body;
a plurality of road wheels attached to the vehicle body;
a traction motor attached to the vehicle body and configured to drive at least one of the road wheels and thereby propel the motor vehicle;
a traction battery pack attached to the vehicle body and electrically coupled to the traction motor to power the traction motor;
a vehicle navigation system attached to the vehicle body and including a location tracking device, an input device, and an electronic display device; and
a resident vehicle controller attached to the vehicle body and programmed to:
determine, via the location tracking device and the input device of the vehicle navigation system, a vehicle location and a vehicle destination for the motor vehicle;
determine, via the vehicle navigation system, a designated route corresponding to the vehicle origin and vehicle destination;
determine, via a remote computing resource service from a memory-stored map database, road-level data associated with the designated route;
determine, via the remote computing resource service based on the road-level data and roadway traffic and disturbance data for the designated route, a predicted motor speed of the traction motor for the designated route;
determine, via the remote computing resource service, a predicted motor torque of the traction motor by applying a machine-learning driver model as a function of accelerator pedal position to the predicted motor speed;
determine, via the remote computing resource service by integrating the predicted motor torque, a total motor energy usage for the traction motor to propel the motor vehicle across the designated route from the vehicle origin to the vehicle destination; and transmit a command signal to a resident vehicle subsystem to execute a control operation based on the total motor energy usage.

16. The electric-drive motor vehicle of claim 15, further comprising a power inverter module and/or an AC-DC converter each operable to modulate a voltage transmitted to or from the traction motor, wherein the resident vehicle controller is further configured to:

calculate, via the remote computing resource service, an inverter/converter energy loss as a function of the predicted motor speed and predicted motor torque for the designated route, wherein the command signal to execute the control operation is further based on the inverter/converter energy loss.

17. The electric-drive motor vehicle of claim 16, wherein the resident vehicle controller is further configured to:

calculate, via the remote computing resource service, a motor energy loss of the traction motor as a function of the predicted motor speed and the predicted motor torque for the designated route, wherein the command signal to execute the control operation is further based on the motor energy loss.

18. The electric-drive motor vehicle of claim 15, wherein the resident vehicle controller is further configured to:

calculate, via the remote computing resource service, an estimated auxiliary device energy usage for one or more in-vehicle electronic devices operated during the designated route, wherein the command signal to execute the control operation is further based on the estimated auxiliary device energy usage.

19. The electric-drive motor vehicle of claim 15, wherein the resident vehicle controller is further configured to:

calculate, via the remote computing resource service, an estimated autonomous-driving electronics energy usage for one or more in-vehicle sensors, cameras and/or processors operated during the designated route, wherein the command signal to execute the control operation is further based on the estimated autonomous-driving electronics energy usage.

20. The electric-drive motor vehicle of claim 15, wherein the resident vehicle controller is further configured to:

calculate, via the remote computing resource service based on the total motor energy usage, a predicted total load current for the motor vehicle to traverse the designated route from the vehicle origin to the vehicle destination, wherein the command signal to execute the control operation is further based on the predicted total energy usage.

* * * * *